A. V. LINDQUIST.
FISHLINE LEADER.
APPLICATION FILED FEB. 18, 1920.
1,370,696.
Patented Mar. 8, 1921.
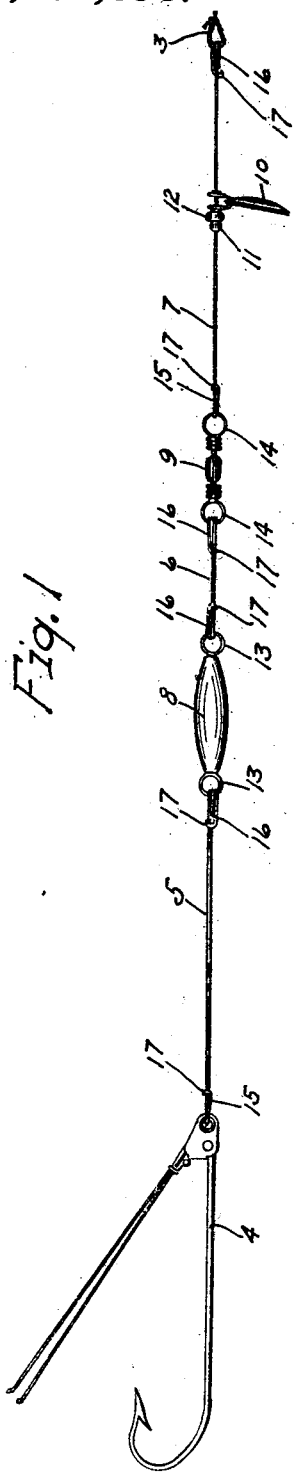
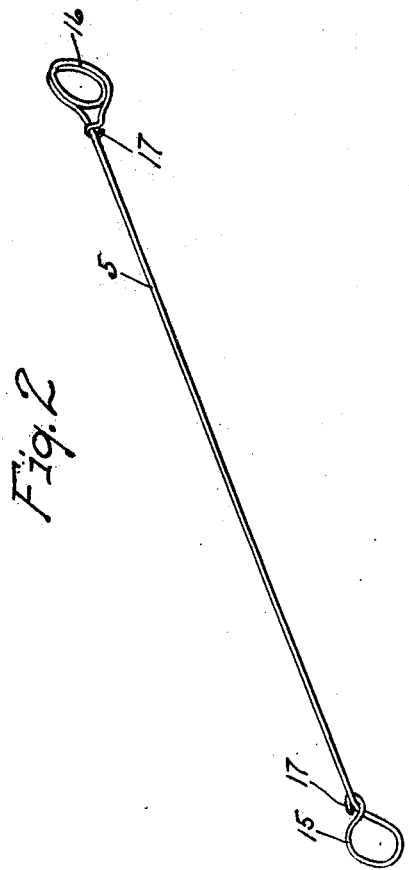
INVENTOR
Albert V. Lindquist
BY HIS ATTORNEYS
Williamson Merchant

UNITED STATES PATENT OFFICE.

ALBERT V. LINDQUIST, OF ALEXANDRIA, MINNESOTA.

FISHLINE-LEADER.

1,370,696.   Specification of Letters Patent.   Patented Mar. 8, 1921.

Application filed February 18, 1920. Serial No. 359,727.

*To all whom it may concern:*

Be it known that I, ALBERT V. LINDQUIST, a citizen of the United States, residing at Alexandria, in the county of Douglas and State of Minnesota, have invented certain new and useful Improvements in Fishline-Leaders; and I do hereby declare the following to be a full, clear, and exact description of the invention, such as will enable others skilled in the art to which it appertains to make and use the same.

My invention has for its object to provide an extremely simple and highly efficient fish-line leader, and to this end, it consists of the novel devices and combinations of devices hereinafter described and defined in the claims.

In the accompanying drawings, which illustrate the invention, like characters of reference indicate like parts throughout the several views.

Referring to the drawings:

Figure 1 is a view showing a fish hook connected to a fish line by means of the improved leader in one of its various different combinations; and Fig. 2 is a perspective view of one of the sections of the leader.

The numeral 3 indicates a fish line, and the numeral 4 indicates a weedless fish hook of the type disclosed and broadly claimed in my U. S. Letters Patent, #1,306,383, issued June 10, 1919.

The improved leader, as made up in Fig. 1, comprises an outer section 5, an intermediate section 6, and an inner section 7. The sections 5 and 6 are separably connected by a sinker 8, and the sections 6 and 7 are separably connected by a swivel 9. Both sections 5 and 7 are identical, the one with the other, with the exception that a spoon 10 is mounted on the section 7, and the traveling movement toward the hook 4 is limited by a stop bead 11 secured to said section. A washer 12, of glass or other suitable material, is interposed between the spoon 10 and bead 11. Eyes 13 are formed on the ends of the sinker 8, and eyes 14 are formed on the ends of the swivel 9. The fish line 3 is attached to the inner end of the leader 7 and the fish hook 4 is attached to the outer end of the section 5.

Each leader section is formed from a single piece of very fine stiff spring wire, and one end portion of each section 5 and 7 is bent to form a single loop open eye 15, and the other end portion thereof is bent to form a double loop open eye 16. As shown, both ends of the section 6 are formed with the double loop open eyes 16. The extreme ends of each leader section are bent to form hooks 17 arranged to separably interlock with the bodies of said sections to close the open eyes 15 and 16.

The several sections of the leader and the sinker 8 and swivel 9 are flexibly connected by interlocking the eye 15, of the section 5, with the eye in the hook 4, and the eye 16, of said section, is interlocked with one of the eyes 13 of the sinker 8. The eyes of the intermediate section 6 are interlocked with the other eye of the sinker 8 and with one of the eyes 14 of the swivel 9. The eye 15, of the section 7, is interlocked with the other eye 14, of the swivel 9, and the eye 16 of said section is interlocked with a loop tied in the fish line 3.

While the leader shown in Fig. 1 is made up of several sections, it is, of course, understood that the sinker 8 may be detached from the eye 16 in the section 5, and the line 3 directly attached to said eye 16, thus using only a single section to connect the hook to the line. It will thus be seen that a fisherman may carry, with his outfit, several leader sections, which may be of the same length or of various different lengths, and secure a hook directly to a line or interpose therein a sinker, swivel or other attachment. In the various different arrangements of the leader or the sections thereof, the line 3 will always be fastened in one of the eyes 16, for the reason that said eyes are formed with double loops, which are not so liable to cut a line as a single loop would, because the inner annular surfaces of the double loop eyes 16 are perfectly smooth and the cross section thereof is materially greater.

From the above description, it is evident that the eyes in the leader may be very quickly opened to release a held object, such as a hook or line, that is connected thereto, and likewise, very quickly closed, and when closed, will securely hold an attached object.

What I claim is:

1. A fish line leader formed from a stiff spring wire having at one of its ends a double loop open eye provided with a hook arranged to be separably interlocked with the body of the leader to close the eye.

2. A fish line leader formed from a stiff spring wire having at one of its ends a single loop open eye and at its other end a double loop open eye, said eyes being provided with hooks arranged to separably interlock with the body of the leader to close said eyes.

In testimony whereof I affix my signature in present of two witnesses.

ALBERT V. LINDQUIST.

Witnesses:
  RALPH S. THORNTON,
  F. A. AAL.